United States Patent [19]
Murphy

[11] Patent Number: 5,384,049
[45] Date of Patent: Jan. 24, 1995

[54] WASTEWATER TREATMENT PROCESS

[76] Inventor: D. Thomas Murphy, 584 Mililani Dr., Kihei, Hi. 96753

[21] Appl. No.: 6,976

[22] Filed: Jan. 21, 1993

Related U.S. Application Data

[62] Division of Ser. No. 753,860, Sep. 3, 1991, Pat. No. 5,186,821, and Ser. No. 850,113, Feb. 19, 1992, Pat. No. 5,234,580.

[51] Int. Cl.$^6$ ............................ C02F 3/02; C02F 3/12
[52] U.S. Cl. .................... 210/629; 210/519; 210/620
[58] Field of Search ............... 210/139, 141, 142, 220, 210/237, 242.2, 519, 532.1, 540, 620, 629, 804, 221.1, 221.2, 521, 622

[56] References Cited

U.S. PATENT DOCUMENTS

| | | | |
|---|---|---|---|
| 2,140,059 | 12/1938 | Simonsen | 210/519 |
| 2,624,463 | 1/1953 | Freese | 210/519 |
| 3,834,536 | 9/1974 | Kelsey | 210/104 |
| 3,907,672 | 9/1975 | Milne | 210/220 |
| 4,092,249 | 5/1978 | La Gatta | 210/194 |
| 4,139,471 | 2/1979 | Foti | 210/170 |
| 4,230,578 | 10/1980 | Culp et al. | 210/86 |
| 4,278,541 | 7/1981 | Eis et al. | 210/112 |
| 4,325,823 | 4/1982 | Graham | 210/86 |
| 4,376,045 | 3/1983 | Siskind | 210/519 |
| 4,468,327 | 8/1984 | Brown et al. | 210/626 |
| 4,618,426 | 10/1986 | Mandt | 210/237 |
| 4,645,592 | 2/1987 | Calltharp et al. | 210/142 |
| 4,818,384 | 4/1989 | Mayer | 210/86 |
| 4,818,392 | 4/1989 | Werner et al. | 210/195.3 |
| 4,822,485 | 4/1989 | Mayer | 210/123 |
| 5,021,161 | 6/1991 | Calltharp | 210/629 |
| 5,186,821 | 2/1993 | Murphy | 210/139 |
| 5,205,936 | 4/1993 | Topnik | 210/629 |

OTHER PUBLICATIONS

Published article "Developments . . . Process Equipment, Editor-C. S. Cronan," Treater Counters High BOD Waste Streams, Apr. 1957, Chemical Engineering-p. 186.

Primary Examiner—Joseph W. Drodge

[57] ABSTRACT

Disclosed is a single basin, fill and draw wastewater treatment apparatus and method having a unique influent delivery manifold which delivers the incoming influent into a first zone that prevents hydraulic turbulence or short circuiting of un-treated influent from degrading the effluent quality during the decant phase of its cycle while continuously accommodating influent flows and reduces the internal hydraulic velocities to a slow enough rate to utilize the settling sludge blanket as a natural biological filter to absorb and treat influent flows during the air/off phase of its cycle.

2 Claims, 9 Drawing Sheets

WASTEWATER TREATMENT PROCESS

CROSS REFERENCE TO RELATED APPLICATIONS

The present invention is a division of Ser. No. 07/753,860, filed Sep. 3, 1991, now U.S. Pat. No. 5,186,821 and Ser. No. 07/850,113 filed Feb. 19, 1992, now U.S. Pat. No. 5,234,580 are incorporated herein by reference.

FIELD OF THE INVENTION

This invention relates to sewage treatment and more particularly to a system involving an open basin or tank containing a cyclic operation which includes air diffusion of solids, liquid separation and then decanting.

BACKGROUND OF THE INVENTION

U.S. patent application Ser. Nos. '860 and '113, the disclosures of which are incorporated herein by reference, discloses and claims an improved wastewater treatment process referred to as I.D.E.A. "C.F.C.R." which is an acronym for "Intermittent Decant Extended Aeration Continuous Feed Cyclic Reactor" and incorporates CONTINUOUS FEED activated sludge technology with intermittent CYCLIC system operation requiring only a SINGLE BASIN. The system uses a single tank (reactor basin), preferably made of fiberglass in which the activated sludge is aerated over a number of pre-determined cycles. Solid/liquid separation occurs during the air-off cycle. Treated effluent is decanted or withdrawn from directly below the liquid surface. Influent inflow is continuously accommodated at all times. In this way the function of flow equalization, biological oxidation, nitrification, denitrification, secondary sedimentation and aerobic sludge digestion are all carried out in a single vessel. The duration of a cycle is specific to each design application and variable in the field as required.

The Continuous Feed Cyclic Reactor (C.F.C.R.) Process of the I.D.E.A. System combines SBR, ICEAS, and Continuous Flow Activated Sludge and Extended Aeration Principles. It is a fill and draw system which accommodates continuous feed (influent) to the tank (reactor basin). The heart of the process lies in the activated sludge blanket which reduces the BOD5 (biological oxygen demand) and TSS (total suspended solids) and removes nitrogen and phosphorous in the absence of polymers or filters. Food to microorganism ratios (F:M) may vary from 0.04 to 0.3 lb. of BOD5 /lb of MLSS/DAY and mixed liquor suspended solids (MLSS) design concentrations range from 1,000 to 15,000 mg/l. Actual practice has shown MLSS concentration in the 2,000 to 8,000 mg/l range to be most effective. With a hydraulic retention time (HRT) targeted for 18-36 hours and a sludge age (SRT) of at least 20 days. The Intermittent Decant Extended Aeration (I.D.E.A.) system is sized according to extended aeration standards. With such design parameters, typical excess solids (waste sludge) production ranges from 0.5 to 1.0 LB/LB of BOD5 removed. The sludge produced is quite stable with an O2 uptake rate of less than 10 mg/l O2/gm MLSS/hr.

One of the major process advantages of the Intermittent or Cycled Extended Aeration Process (EPA Design manual "On Site Waste-Water Treatment and Disposal Systems", October 1980.) used in the I.D.E.A. System is that it provides nitrification/denitrification in addition to carbonaceous BOD5 reduction and solids removal without the addition of methanol as an organic carbon source. In addition, denitrification enhances alkalinity recovery. This prevents a PH drop which could contribute to filamentous growth and bulked sludge. Alkalinity recovery is particularly advantageous in regions of low natural alklinity.

It is this unique cyclic process which allows the I.D.E.A System to accomplish nitrification and denitrification. During aeration, biological oxidation and mixing occur. Blower sizing typically provides for 1.4 to 1.6 LBS. of O2/LB of BOD applied/day. For very low strength waste, 20 SCFM/1000 cubic feet reactor volume is provided for mixing. During aeration, excess oxygen is present, and Nitrosomonas sp. oxidize the Ammonia Nitrogen (N/NH3) to Nitrite Nitrogen (N/NO 2). Nitrobacter sp. further oxidize the Nitrite Nitrogen (N/NO2) to Nitrate Nitrogen (N/NO3). Both of these are naturally occurring bacteria as a result of this Cycled Extended Aeration "CFCR" Process.

Nitrate, Nitrite, Ammonia and Organic Nitrogen are all inter-related in wastewater. All of these forms of Nitrogen, as well as Nitrogen Gas are biochemically interconvertible. Ammonia is generally found in large quantities in fresh domestic wastewater, however Nitrate is found only in small amounts. But in the effluent of conventional Nitrifying biological treatment plants, Nitrate is found in concentrations of up to 50 mg/L Nitrate Nitrogen. Nitrite is an intermediate state of Nitrogen, both in the oxidation of Ammonia to Nitrate and in the reduction of Nitrate to Nitrogen Gas. Such oxidation occurs in the I.D.E.A. System.

During non-aerated periods (sedimentation and decantation), the Dissolved Oxygen (DO) level in the sludge blanket (MLSS) approaches zero. The lack of molecular oxygen (O2) encourages Pseudomonas sp. and other denitrifying bacteria to attack the oxygen bound up in the Nitrate (NO3) molecules. The bacteria then reduce the Nitrate (NO3) molecules to nitrogen (N2) and oxygen (O2). The molecular Nitrogen (N2), a gas, is released to the atmosphere, while the bacteria utilize the liberated Oxygen (O2). Thus, alternation of oxic and anoxic periods in the I.D.E.A. basin promotes Ammonia Nitrogen (N/NH3) removal from the waste stream of 95% or better.

Additional Nitrogen removal is accomplished through assimilation (absorption and incorporation) of Nitrogen into bacterial cell mass in satisfaction of metabolic needs. This Nitrogen is removed from the system when excess sludge is wasted from the I.D.E.A. basin. Actual operating data have shown the concentration of nitrogen in the sludge mass to be between 5% and 8% by weight of the dry solids. As can be seen, the nutrient removals and high degree of treatment characteristic of tertiary treatment systems can be had at the cost of an I.D.E.A. "CFCR" secondary treatment system.

While the '860 application teaches the above improved apparatus and method it teaches primarily a circular IVE collector and a circular partition to surround the IVE collector which substantially limits the ratio of the bottom open area around the skirt to the volume ratio inside. The primary advantage of the present improvement is to make the IVE collector and the partition which surrounds it in the form of a rectangular configuration in order to increase the skirt ratio to the inside volume ratio thus causing hydraulic flow equalization velocity flow reduction.

In the past, other attempts have been made which address the problem of hydraulic velocity such as U.S. Pat. No. 4,468,327 which provides an elongated tank having a length between 3.5 and 6 times the width thereof which requires decanting from the opposite end of the tank from it's inlet and also teaches a transverse baffle across the tank dividing the tank into a first portion adjacent the inlet and a second portion remote from the inlet. The volume ratio of said first portion to said second portion being between about 1;10 to about 1;3. The baffle wall is not adjustable but has an opening at or adjacent to the lower edge of the baffle wall to allow influent passing into the tank to pass through the openings and into the main body of the tank. In the event of a "storm flow" situation, which occurs often especially when using lift stations as a means of influent input, all of the influent must pass through these openings and has been the source of excessive hydraulic flow which disturbs the sludge blanket in the main tank. The '327 reference has no means to change the ratio of hydraulic flow as does the present improvement and invention. Also the method claims of the '327 reference requires at least one transverse baffle and decanting at a point remote from the inlet.

Also, the prior art such as is illustrated by the '327 reference in what is commonly called the "pre-react zone" allows the incoming influent to create downward velocities in the pre-react chamber which does not allow undisturbed settling of the sludge blanket in that chamber during the air off settle and decant phases of their cycle.

Also, a ratio of no less than 1–10 is required in the pre-react zone. With this capacity of 10% to 30% of the total volume this system encounters extremely high flow velocities during hydraulic equalization between the pre-react and the main react zones during the settle and decant phases.

During times that the system is receiving peak influent flows and decanting, these transfer velocities will be as much as 6 times greater than those of the present invention.

The prior art also has no means to variably control the hydraulic velocities at start up when the sludge blanket is relatively thin as compared to the sludge blanket when it reaches maturity.

Also, the prior art such as is illustrated by the '327 reference does not have a naturally bio-mass filtering action in the first chamber but is relying on the transfer underneath the sludge blanket in the second chamber, thus requiring decanting at as remote a distance as possible away from the output of the first chamber so as to allow upset sludge caused by hydraulic flows to again settle before reaching the decanter at the other end of the tank. This again causes hydraulic disturbance and excessive overflow velocities as all the effluent must travel the full distance of the second chamber to reach the decanter means. Unlike the present invention, the prior art such as is illustrated by the '327 reference, requires an elongated tank to get the decanting process as far away as possible from the incoming influent and states that they require a length of 3.5 to 6 times the width.

SUMMARY

For the purposes of clarification we have elected to use the word "zone" as opposed to —chamber— in the following objects and explanations as more clearly defining the intent and objectivity of this disclosure and the word "zone" as used in this context is intended to convey one of Websters definitions, namely, "any encircling area or structure having a special character or composition".

It is therefore a primary objective to provide a wastewater treatment process and apparatus that accommodates continuous influent flows that simultaneously contains and controls and isolates splash energies caused by the incoming influent, and distributes the influent below the water level at a reduced velocity in an other-than-downward direction so as to avoid upset or disturbance of the settling or settled Biomass (sludge blanket) which occurs in the lower portion of the Pre-React Zone and Main React Zone during the air/off phases of the operation cycle.

It is another object to provide a method of creating a Pre-React Zone that can have a large under-skirt area as compared to its volumetric capacity so as to reduce the hydraulic velocities created by inherent hydraulic equalization that consistently occurs between the Pre-React and Main React Zones.

It is still another object to reduce transfer velocities to a low enough rate that even during a peak hydraulic influent flow while the system is in the draw-off (decant) phase, the sludge blanket settled or settling in the lower portions of the Pre-React Zone and the Main React Zone remains intact.

It is yet another object to provide a wastewater treatment process that utilizes the sludge blanket consisting of biomass as a natural biological filter to filter and absorb influent organics and inorganics as the influent flows into the sludge blanket at the lower portion of the Pre-React Zone while displacing treated supernatant out of the sludge blanket in the Main React Zone.

Yet another important object is to provide enough lineal skirt area in a geometric configuration so as to substantially decrease the volume of liquid contained inside the Pre-React Zone as compared to the lineal under-skirt area of the Omni-flow partition and the densely settled blanket of biomass and underneath the bottom edge of the Omni-flow partition continuing up the outer edge of the outer parameter of the Omni-flow partition surface allowing hydraulic transfer to take place by means of this channel at a slow enough velocity due to the high lineal feet of this channel at a slow enough rate so as not to wash out or upset the densely settled blanket of biomass but still receiving treatment of the transferring effluent by contact with biomass, this stage of the process cycling developing after an extended period of settling which occurs in the latter part of the air-off phase of the process cycle.

Still another object is to reduce the total volume ratio in the first zone as compared to the second zone thus decreasing the hydraulic flow velocity created by the hydraulic equalization taking place during the settle and decant phases.

Another object is to maximize the area at the bottom of the Pre-React zone partition through which the flow equalization occurs between the first and second zone by creating up to a 360 degree skirt area opening at the bottom of the Omni-flow partition above the floor of the tank.

A further object is to further increase the skirt area of the first zone as compared to the total volumetric capacity of the first zone by using a configuration of engineering choice, such as a rectangle, as compared to a cylindrical shape.

It is another object to provide a wastewater treatment process and apparatus which increases the skirt area around the IVE collector.

A further object is to substantially reduce hydraulic flow velocities throughout the system to enhance the settling nature of the biomass therefore producing a more superior effluent quality.

Another object is to prevent downward velocities from being created inside the Omni-flow partition.

Yet another object is to reduce the hydraulic flow velocities from within the Omni-flow partition to the main aeration chamber to less than the velocity that would upset the settling or settled sludge blanket.

Another important object is to reduce hydraulic volumetric capacity of the first chamber from 10% to substantially 5%.

Yet another object is to maximize the area at the bottom of the pre-react zone or first zone through which the flow equalization occurs between the first and second zone by creating as much as a 360 degree skirt area opening at the bottom of the Omni-flow partition above the floor of the tank and may take the shape of any configuration of engineering choice such as a substantially U-shaped partition.

A further object is to provide, if necessary, variable means such as a float system, to control the height of the Omni-flow partition to accommodate "start-up" requirements or mature sludge blanket requirements.

Still another object is to utilize the existing bio-mass sludge blanket as a natural biological filter in the Pre-React zone created by the Omni-flow partition which results in "double filtration" and an increase in population of bacteria which improves the F/M ratio (food to micro-organisms).

Yet another object is to reduce the total volume ratio in the first zone as compared to the second zone thus decreasing the hydraulic flow velocity created by the hydraulic equalization taking place during the decant phase.

Another object is to prevent untreated wastewater inside the Omni-flow partition from short circuiting and getting to the surface of the blanket in the main react zone by filtering it through the sludge blanket settling in the lower portions of the first and second zones during hydraulic flow equalization in the un-aerated phases of the cycle.

Another very important object is to locate the decanting apparatus in a central location in the main react zone to reduce hydraulic overflow velocity by drawing treated supernatant from all sides and ends of the main react zone.

Still another object is for this process to be able to function in a round, L-shaped, square or oblong tank as the location requires without restriction to dimension, instead of having to use a tank 3;5 to 6 times it's width.

It is a further important object to utilize the new technology as disclosed in patents '860, '113 and this disclosure which the applicant considers to be the present invention, in an open pond or body of water as is common to municipal or other large installations by introducing the influent through a manifold into the pond below the surface of the water through at least one IVE collector within a substantially elongated floating Omni-flow partition with its bottom skirt area open.

It is yet another object to utilize the new technology as disclosed in applications '860, '113 and this disclosure which the applicant considers to be the present invention, in an open pond or body of water as is common to municipal or other large installations by removing the effluent through at least one decanter cooperating with a discharge manifold system.

It is still another object to utilize the new technology as disclosed in applications '860, '113 and this disclosure which the applicant considers to be the present invention, in an open pond or body of water as is common to municipal or other large installations by including the cyclic aeration, controls, switches, etc., of the above disclosures to provide the same advantages as disclosed for a closed system such as a tank.

Other objects and advantages will become apparent when taken into consideration with the following drawings and specifications.

DETAILED DESCRIPTION OF THE DRAWINGS

Figure 1:
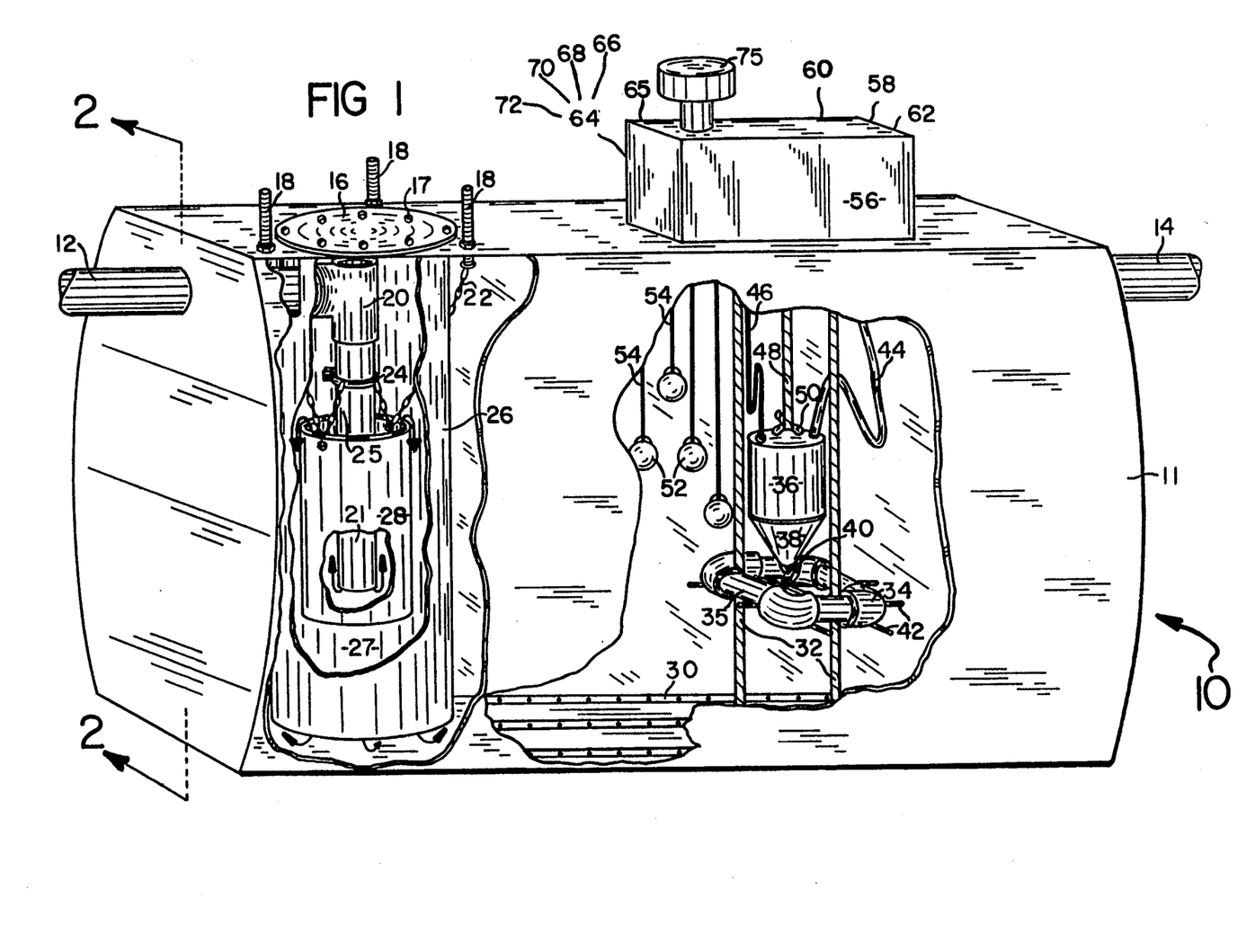
FIG. 1 is a partially cut-a-way perspective view.
Figure 2:
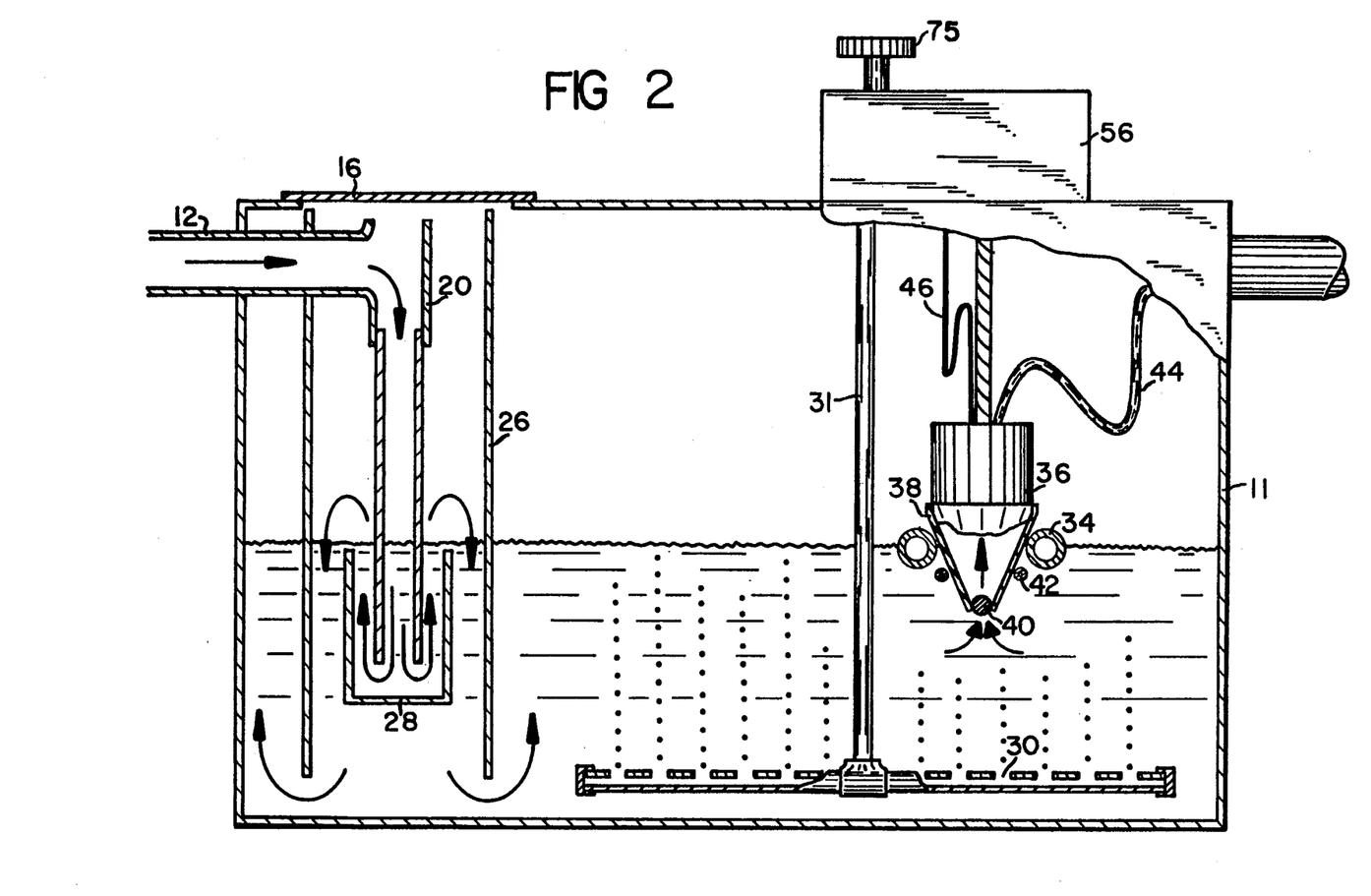
FIG. 2 is substantially a section taken at 2—2 of FIG. 1.

Referring now in detail to the drawings wherein like characters refer to like elements throughout the various drawings, 10 is a general overview of the invention with 11 being a basin or tank made of a material such as fiberglass with it's length being substantially longer than it's width or height while 12 is an influent delivery system such as pipe to deliver influent through pipe tee 20 and pipe section 21 into substantially the bottom section of chamber or collector 28. Collector 28 is adjustable in relation to section 21 by guide ring 24 and suspension chains 25 with 26 being a circular partition adjustably suspended above the floor of basin 11 by chains 22 and adjustable mounting bolts 18 with 16 being an access cover and being secured by fasteners 17. Circular partition 26, being larger in circumference than collector 28, creates a pre-stratification zone 27 while 30 are multiple air diffusers connected to drop pipe 31 with the upper end of drop pipe 31 being suitably connected (not shown) to air compressor 58 which is mounted within the manway 56.

Figures 3, 4:
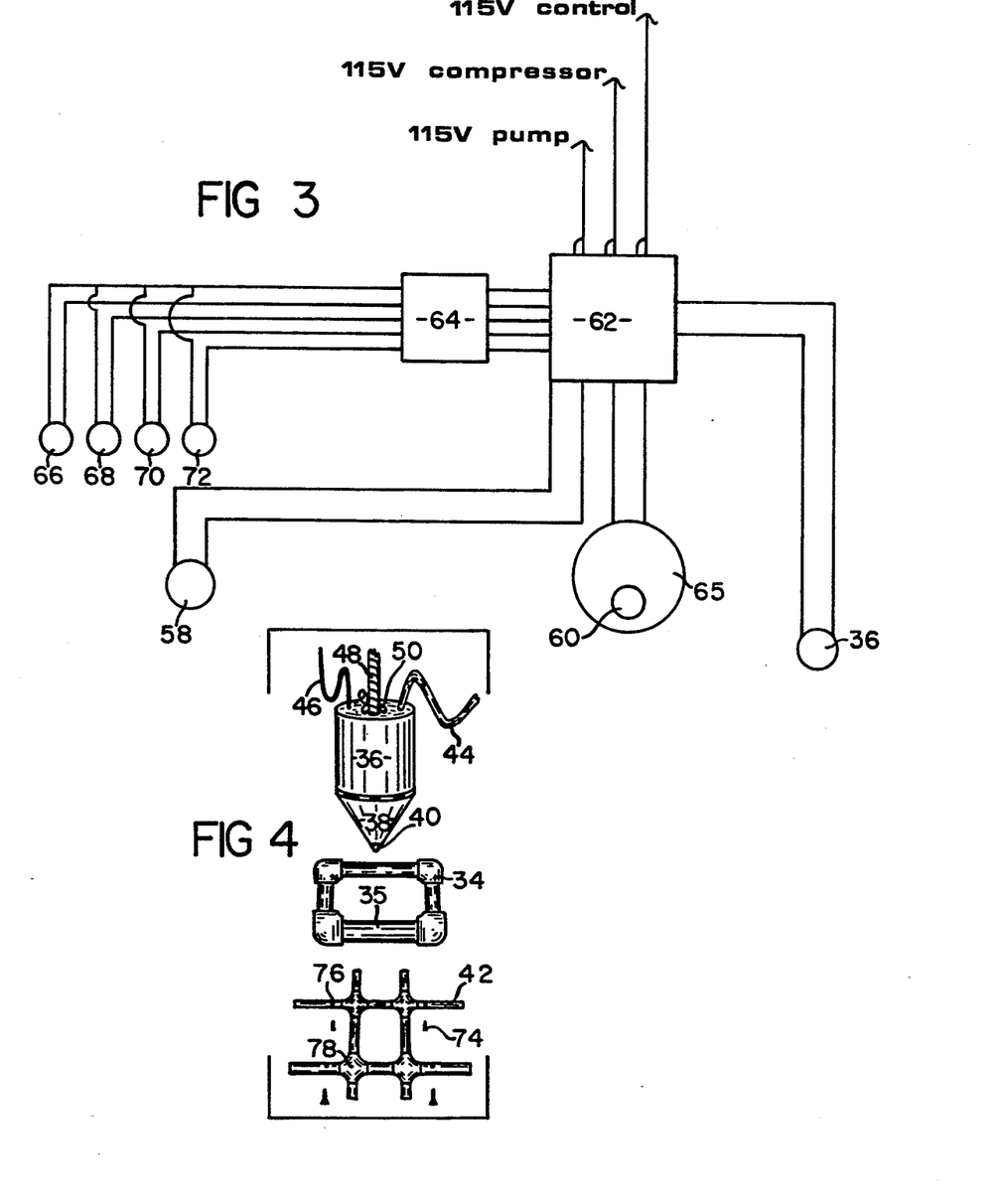
FIG. 3 is a general schematic of the system.
FIG. 4 is an exploded perspective view of the decanter.
Figure 5:
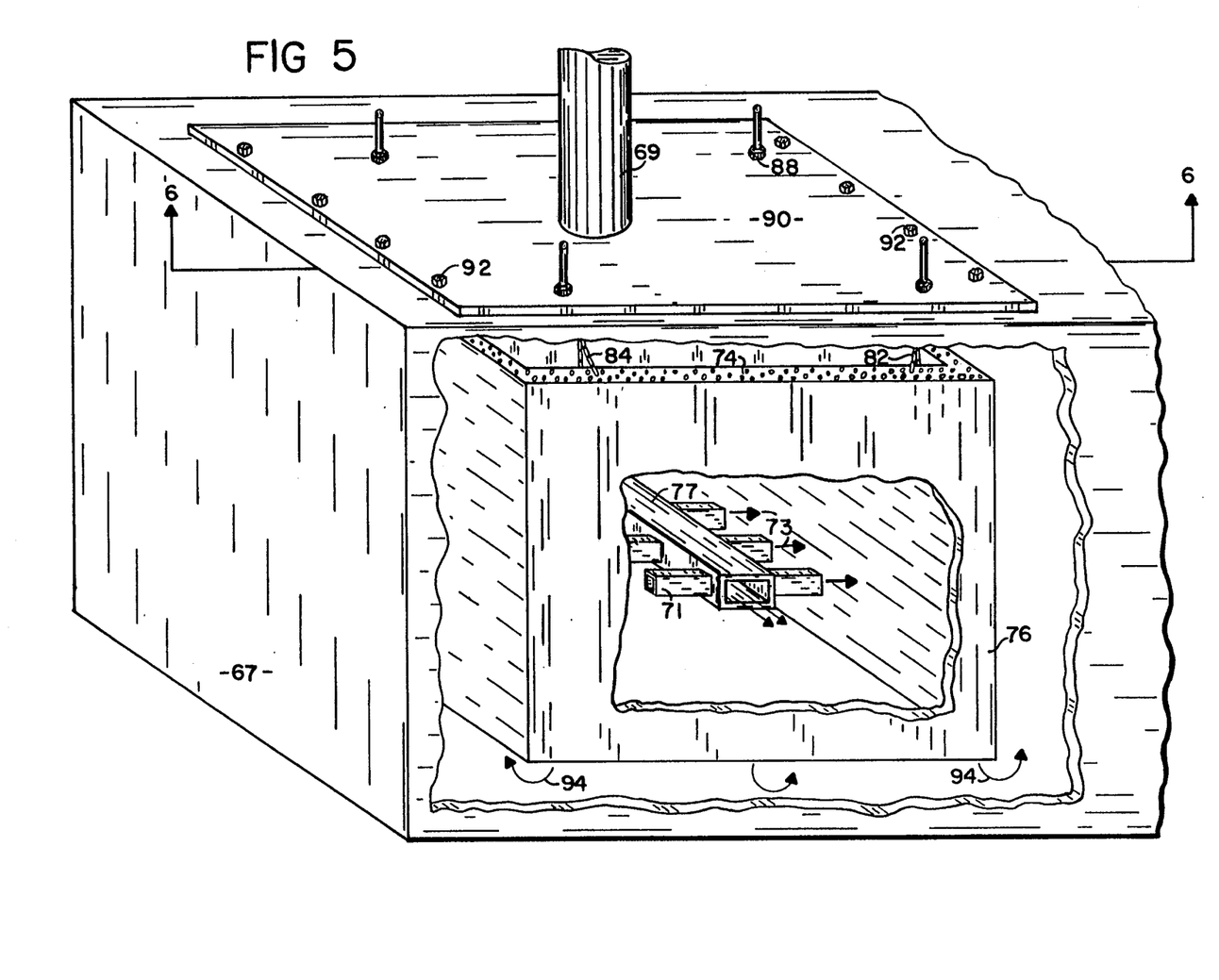
FIG. 5 is a partial, cut-a-way perspective view of the improvement.

32 are ropes or guide lines suitably anchored to the bottom of the basin (not shown) with their upper ends terminating within the manway, (not shown) and act as guides and locating means for the floating decanter base section 35 and elbows 34, with 36 being a submersible motor and suction pump with 38 being a funnel shaped sleeve made of a suitable material such as rubber with it's large open end cooperating with motor and suction pump 36 to provide a seal and it's lower smaller end having a smaller opening cooperating with a ball 40 which acts as a check valve. 42 is a mounting frame made of plastic pipe or other non-corrosive material with 4-way tees 78 being suitably bonded to sections forming a framework substantially in the shape of crossing railroad tracks, with 75 being an above ground, manway cover air-vent. Frame 42 is secured to pipe frame 35 by means such as screws 74, through screw holes 76 with screws 74 being suitably sealed into pipe frame 35 to allow frame 35 to be water tight.

44 is a flexible hose suitably connected to the output of motor and pump 36, with 46 being a submersible power cable and 48 being a rope or cable suitably attached to handle 50 or motor and pump 36. The flexible hose 44 is also suitably connected at it's distal end (not shown) to the affluent output pipe 14, and the distal end of rope or cable 48 terminating inside the manway 56, (not shown).

52 are multiple floats housing suitable switches, such as mercury switches, 66, 68, 70 and 72 respectively, with the floats 52 being adjustably suspended (not shown) from inside the manway 56 by ropes or power cables 54. 60 is a programmable timer suitably mounted on control panel 65 with 62 being a junction box and 64 being a relay junction box.

Referring now to FIGS. 5, 6, 7 and 8 we show one of the improvements of the present invention over the '860 application of the present inventor with 67 now being the basin or tank made of a suitable material such as fiberglass with it's length being at least equal to or longer than it's width while 69 is a pipe to deliver influent into the horizontal, elongated manifold mainframe 77, the manifold mainframe 77 now dispersing the influent into the multiple feeder extensions 71 in a direction other than downward, 71 now discharging into zone 76 as depicted by arrows 73 which is open at it's top 74 and bottom 94. Zone 76 may also be constructed in a square, circular, L-shaped or rectangular design and is adjustable in heights and anchored by means such as chains 82 and 84, respectively.

The distal ends of mounting chains 82 and 84 are connected to their adjusting members such as for example 88 which protrude through the top of the exterior of tank 66 and may be adjusted from the exterior without the necessity of removing mounting and support plate 90 which is mounted to tank 66 by multiple bolts 92.

Figure 6:
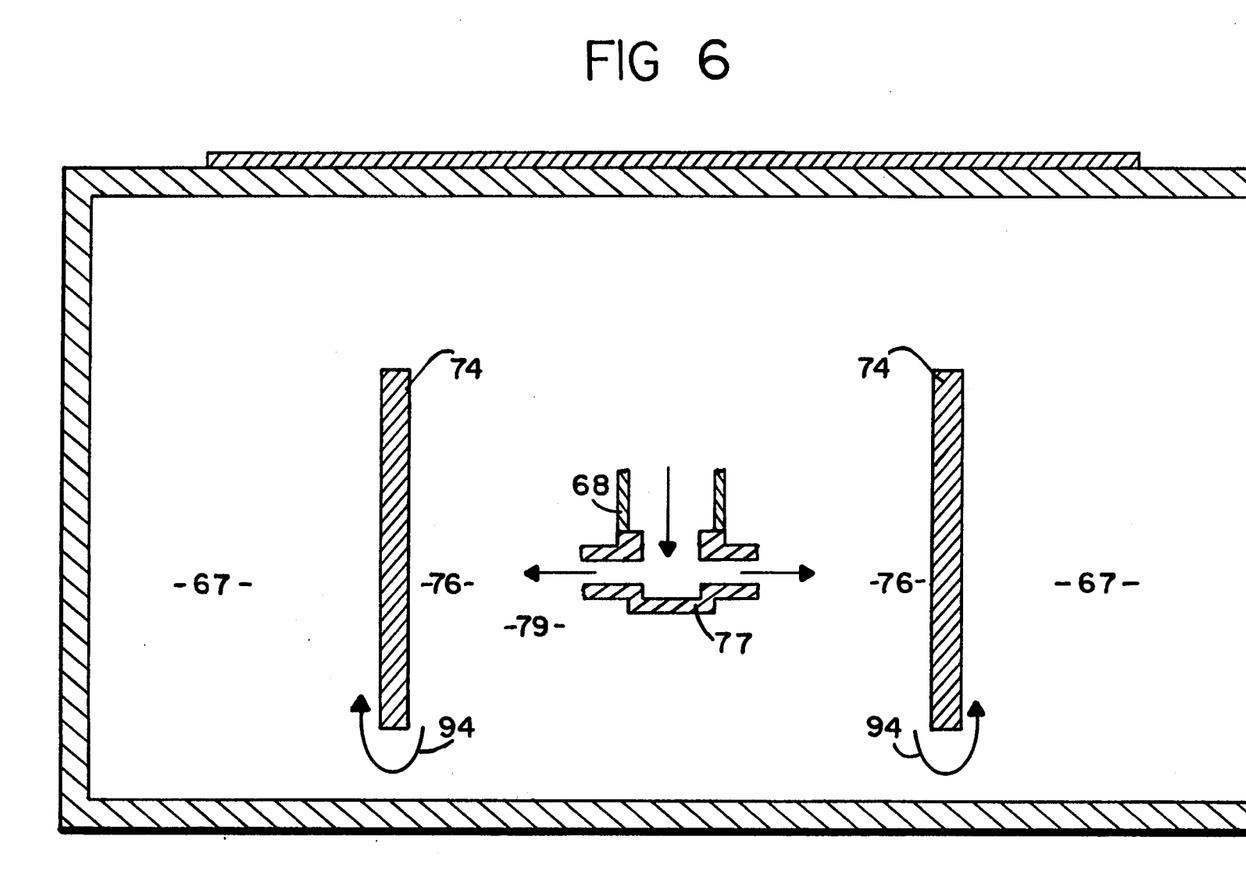
FIG. 6 is a schematic view of the improvement.

A schematic of the hydraulic flow is shown in detail in FIG. 6 with the influent entering through manifold 77 into the bottom of zone 76 and is then forced into the interior of the main tank 67 as depicted by arrows 94.

Figures 7, 8:
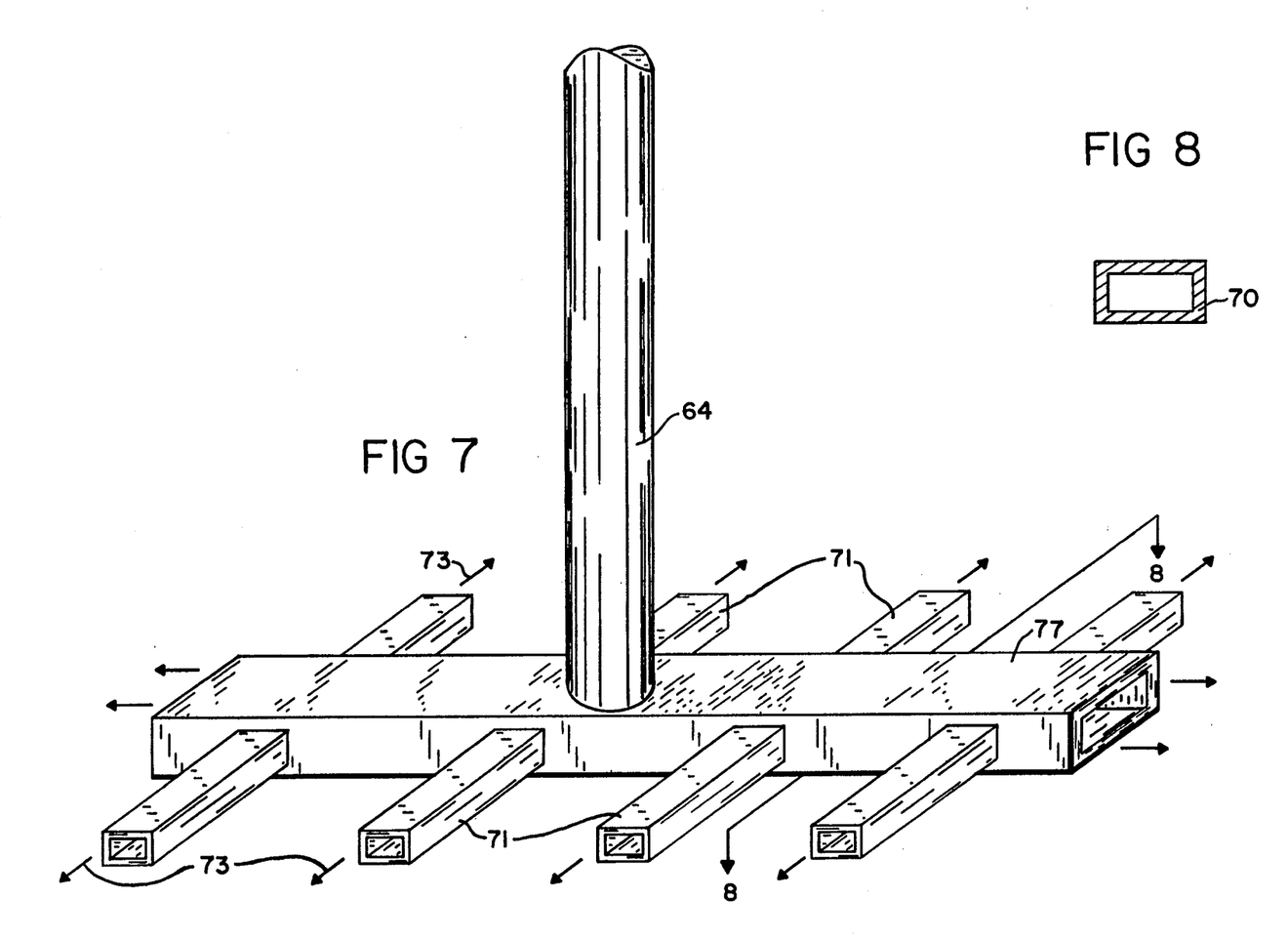
FIG. 7 is a perspective view of the input and manifold leading into the Omni-flow chamber.
FIG. 8 is a section taken at 8—8 of FIG. 7.

FIG. 7 shows a perspective view of a manifold 77 in accordance with the present invention with 69 being the influent delivery pipe which is dispursed into the horizontal, elongated manifold mainframe 77.

Figure 9:
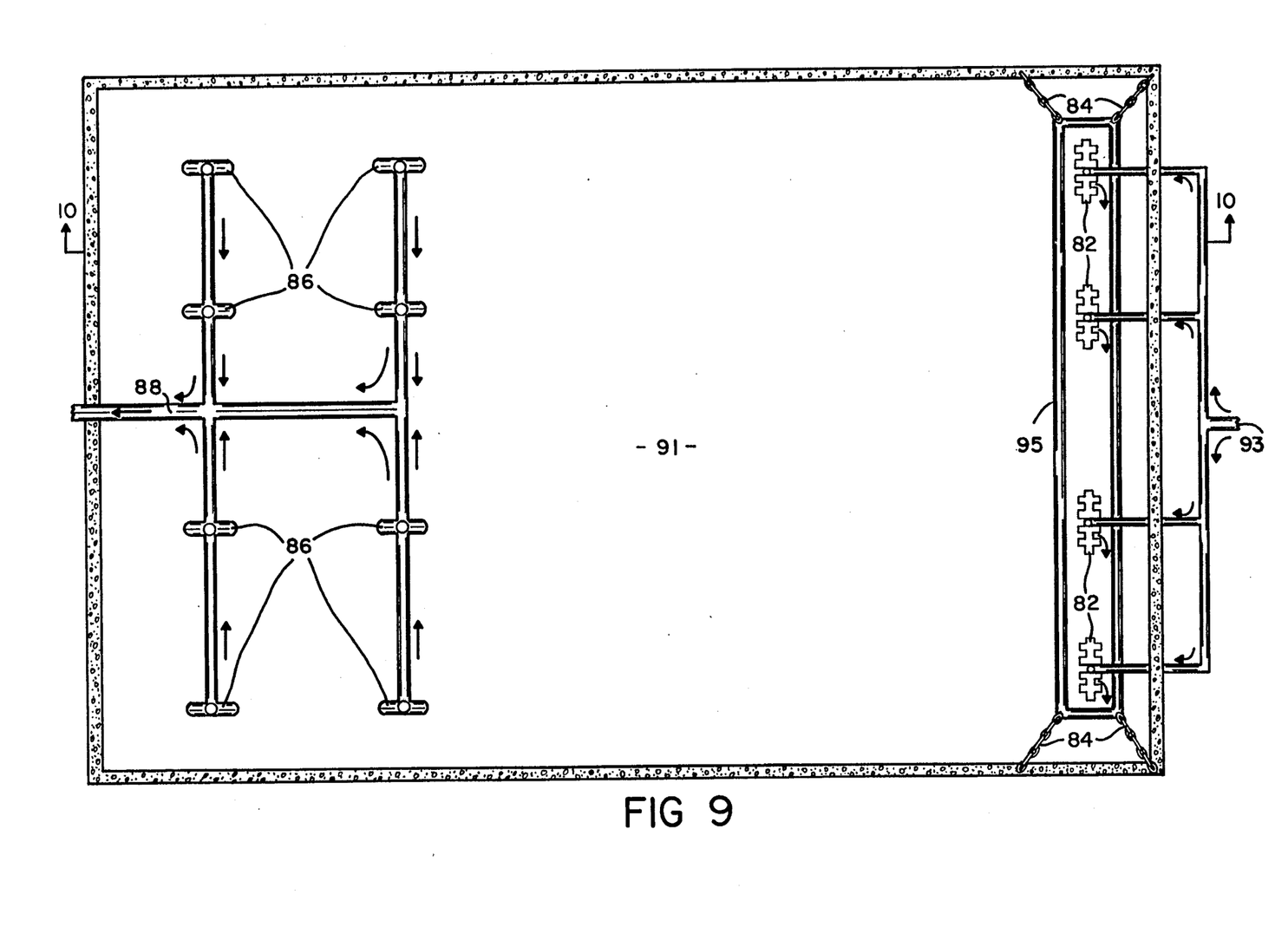
FIG. 9 is a diagrammatic top plan view.
Figure 10:
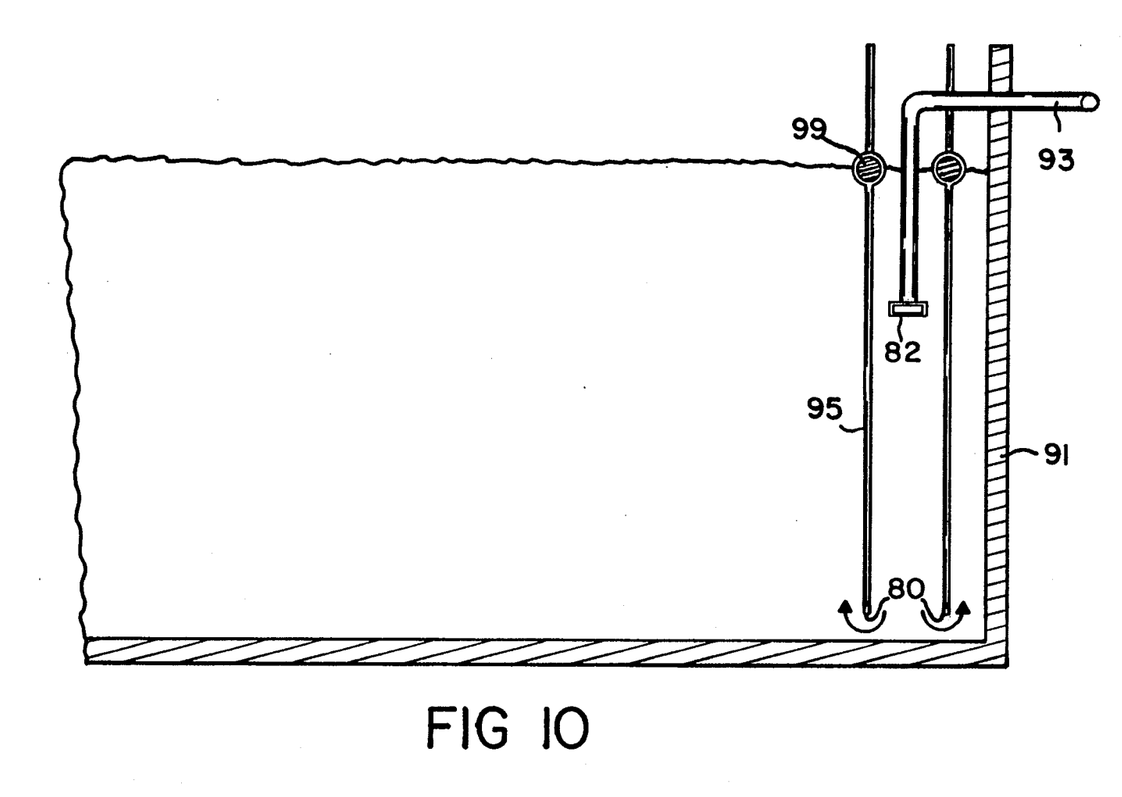
FIG. 10 is a partial diagrammatic plan view in elevation taken at 10—10 of FIG. 9.
Figure 11:
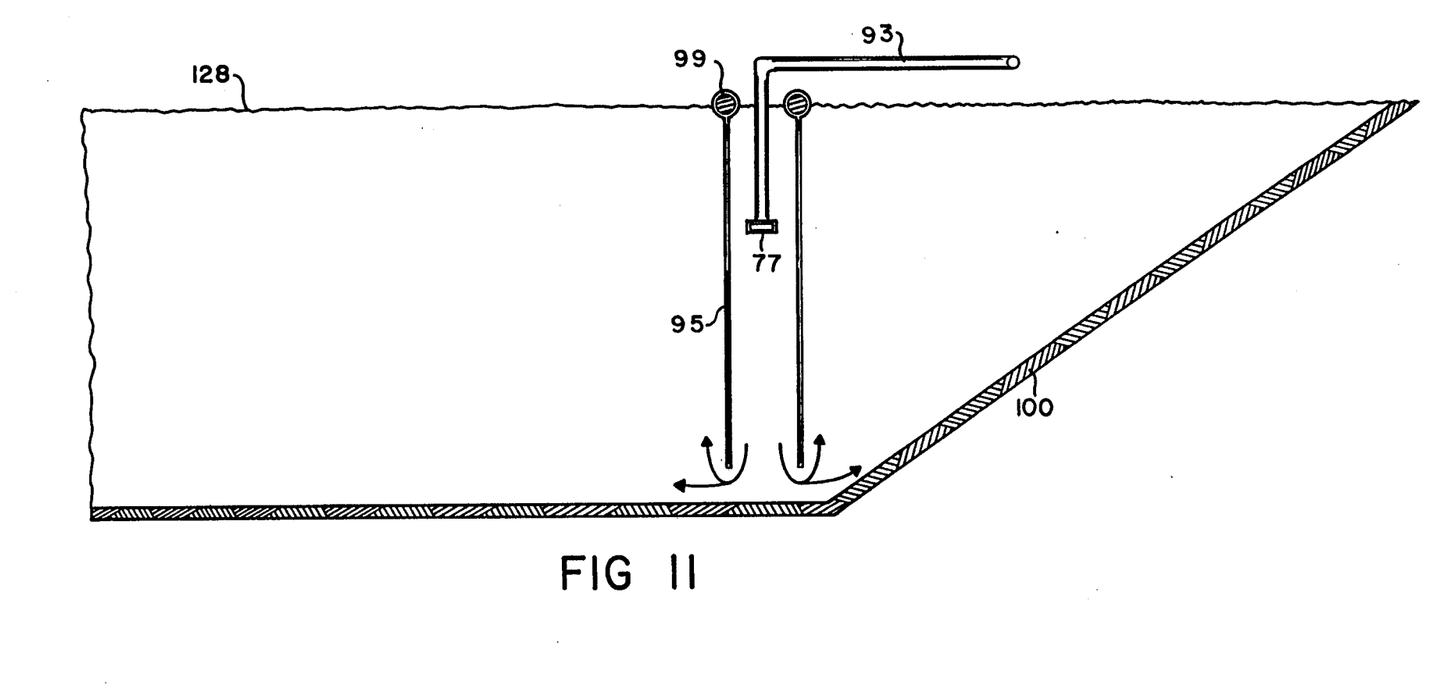
FIG. 11 is a partial diagrammatic plan view in elevation of a different embodiment.

Referring now to FIG. 9, a diagrammatic top plan view is disclosed for using the present invention in a larger, open basin, such as an earth basin 100 or concrete basin 91 as may be used in municipal installations basin with 93 being the influent delivery pipe and 95 being the Omni-flow partition or floating baffles which may be made of any suitable material such as fiber-glass, coated metal or known prior art lagoon partitions such as produced by ENVIRONETICS, INC. Lockport, Ill., having an open skirt area 80 with ganged or multiple manifolds 82 with the Omni-flow partition 95 having anchor adjustment means and float means 99 such as chains 84. 86 are ganged or multiple decanters and 88 being the effluent discharge pipe. The Omni-flow partition 95, the multiple or ganged manifolds 82, and the multiple or ganged decanters 86 cooperate with an aeration system (not shown) and a control system such as taught in patent applications '860 and '113.

It will now be seen that we have provided a wastewater treatment system substantially consisting of a single tank, an influent delivery system, an influent velocity equalization manifold within the tank into which the incoming influent is first deposited, with the manifold being surrounded by at least one square, circular, L-shaped or rectangular partition suspended or supported to be above the tank floor and substantially extending from the bottom to the top of the tank, thus, providing a pre-stratification zone through which only solids of a settled nature are allowed to pass through, aeration means in the main tank, subsurface air diffusers, a floating check-valved solids excluding decanter to decant supernatant from below the surface of the liquid level, an optimum location for the floating decanter, multiple floating switches which are adjustable in height, a programmable timer, a manway, and an access cover located substantially above the I.V.E. collector, whereby, the various named elements cooperate together to provide a minimum of hydraulic turbulence and a maximum quality of supernatant effluent, even in the event of excessive hydraulic organic input of influent.

We have shown the influent collection manifold, and first and second zones as being rectangular in the preferred embodiment, however, it is to be understood that the manifold and first and second zones may take the form of any shape as dictated by the job site such as round, square, L-shaped, etc., to utilize the available space to the best advantage.

We have also shown and described the manifold, Omni-flow partition and decanting system being used in a ganged or multiple arrangement as may be required in large, open municipal systems.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

Having described our invention, what we claim as new, and desire to secure by Letters Patent is:

1. A single basin cyclic wastewater treatment process comprising the facets of;
 a. passing influent into a single basin through at least one inlet;
 b. allowing said influent to continuously, be received from said at least one inlet into a manifold adapted for substantially mitigating splash energy created when said influent comes in contact with a common water level inside said manifold by containing said influent inside of said manifold and isolating said influent from the area within a first enclosure;
 c. allowing said influent to continuously be received through said manifold such that, said influent will exit below said common water level but above a settled sludge blanket zone;
 d. allowing said influent to continuously be received through said manifold such that, influent will exit said manifold below said common water level at a substantially reduced velocity than with which said influent entered said manifold;
 e. allowing said influent to continuously be hydraulically displaced from said manifold in a lateral hydraulic flow direction as opposed to a downward or upward hydraulic flow direction-into a first enclosure having walls, an open top, and an open bottom with an edge, said edge forming a skirt, said skirt being suspended above a bottom of a second enclosure to create an open area, and said second enclosure having walls;

f. allowing said common water level of said manifold and the water level of said first enclosure to communicate and hydraulically equalize within said single basin and flow from said first enclosure underneath said skirt in a lateral hydraulic flow direction into said second enclosure of said single basin, as opposed to a downward or upward hydraulic flow direction;

g. the receiving of said influent being continued during a phase of aerating and mixing said influent;

h. the receiving of said influent being continued while ceasing said aeration and said mixing and initiating i. a setting phase in which activated sludge in said influent settles said first enclosure and said second enclosure after said aeration, creating an activated sludge blanket in lower zones of said first enclosure and said second enclosure such that, the interface of said settled activated sludge blanket of said first enclosure and said second enclosure is substantially above said open area created between said skirt edge of said first enclosure and said bottom of said second enclosure j. the receiving of said influent being continued during a decanting phase in which said settled activated sludge blanket serves as a biological contactor to absorb and filter said influent during hydraulic-flow equalization as said influent passes from inside said first enclosure down through said settled activated sludge blanket within said first enclosure laterally through said activated sludge in said open area and into said settled activated sludge blanket within said second enclosure and displacing treated effluent or supernatant from said settled activated sludge blanket into an upper clarified supernatant zone that exists above said settled activated sludge blanket within said second enclosure without causing upset of said settled sludge;

k. repeating said aerating, settling and decanting phases while preventing influent in said first enclosure from being mixed with treated effluent within said second enclosure during said settling and decanting phases.

2. The wastewater treatment process of claim 1 including a step of raising or lowering said first enclosure to increase or decrease the area beneath said skirt of said first enclosure.

* * * * *